Jan. 11, 1938.　　　　W. ORLOWSKY　　　　2,105,329
MECHANICAL LOADER AND UNLOADER
Filed March 5, 1937　　　2 Sheets-Sheet 2
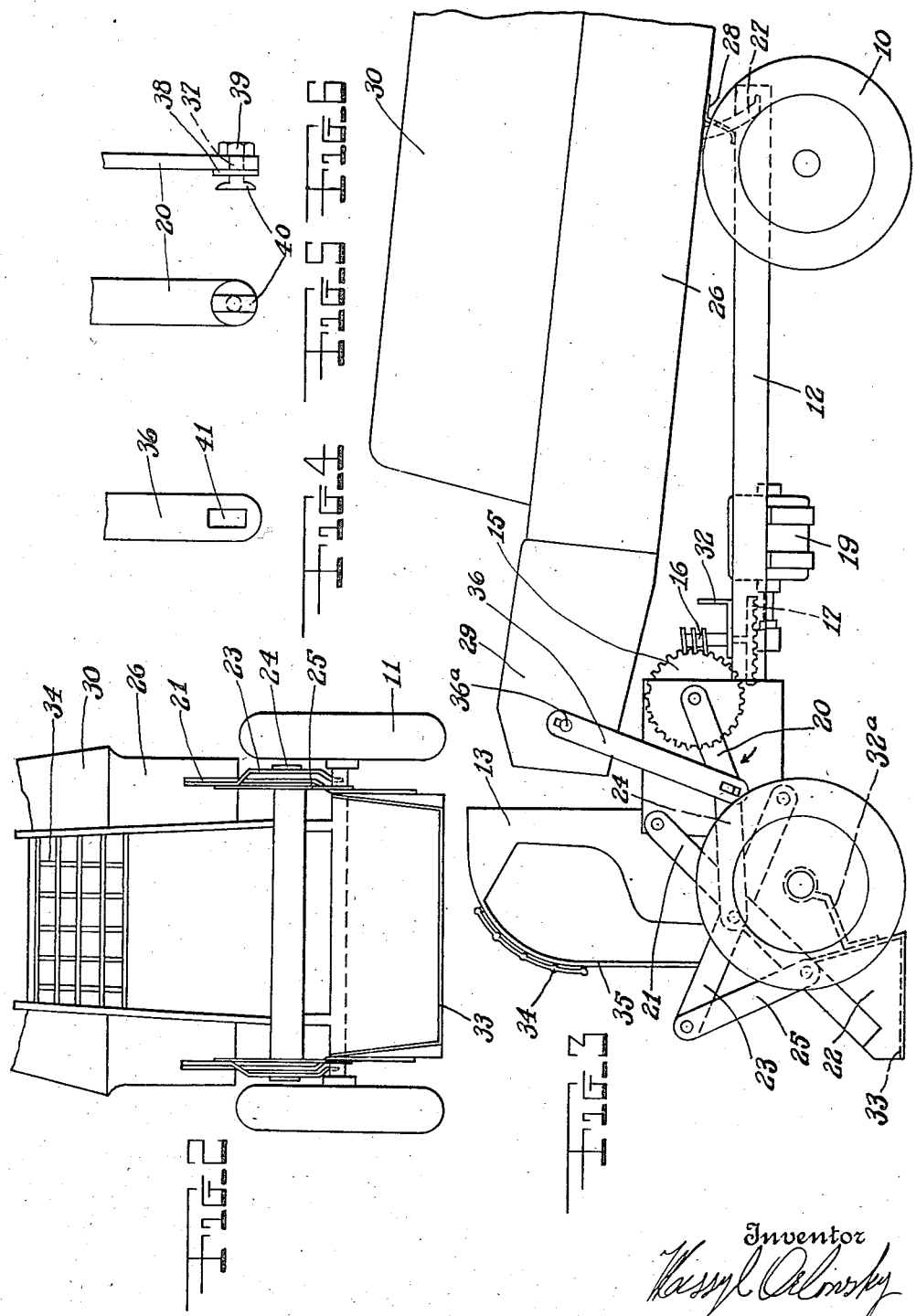
Inventor
Wassyl Orlowsky Patented Jan. 11, 1938

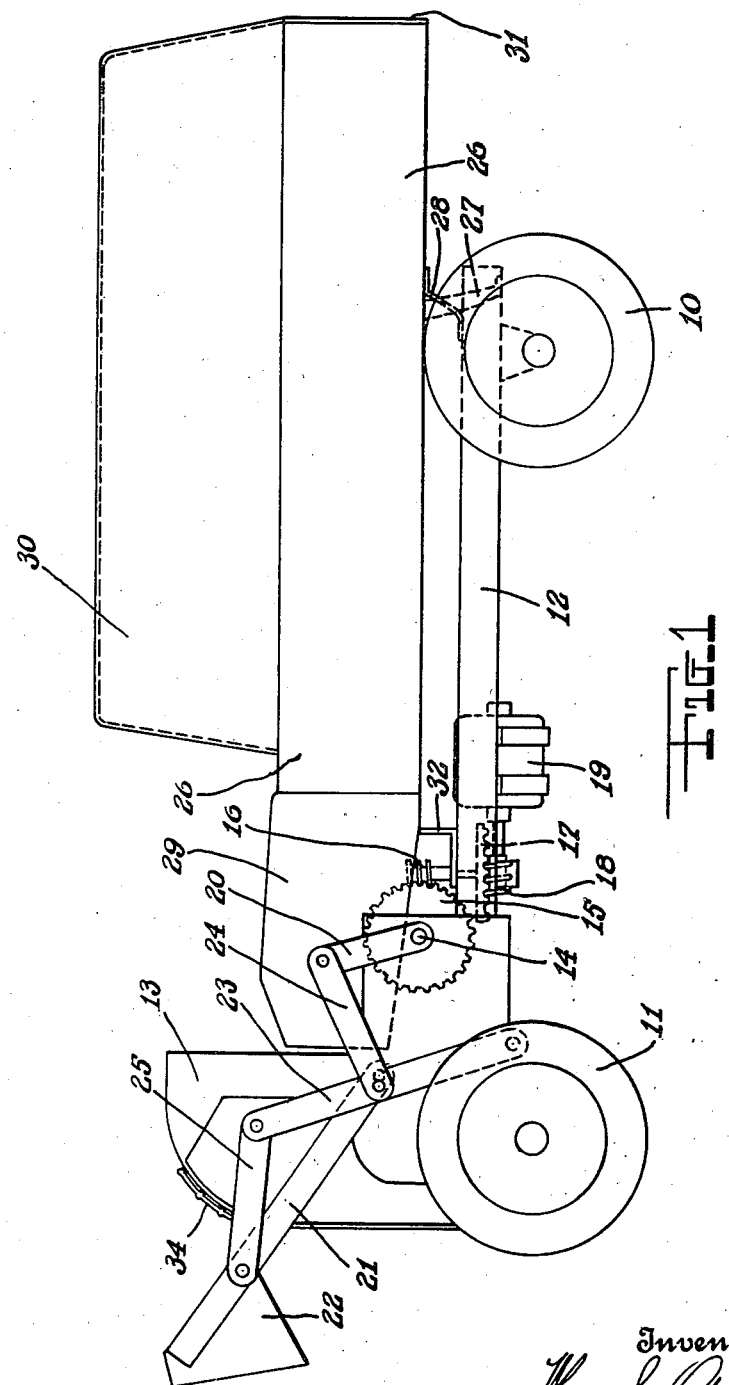

2,105,329

UNITED STATES PATENT OFFICE 2,105,329

MECHANICAL LOADER AND UNLOADER

Wassyl Orlowsky, New York, N. Y.

Application March 5, 1937, Serial No. 129,239

2 Claims. (Cl. 214—78)

The main object of this invention is to provide a mechanically operated vehicle which is capable of simultaneously or selectively loading and unloading the vehicle.

Another object of the invention is to provide a vehicle with a swing shovel and a tiltable body both of which may be selectively operated so that the body may be filled by the operation of the shovel mechanism and emptied by the tilting of the body in a mechanical manner either simultaneously or selectively.

The above and other objects will become apparent in the description below, in which like characters of reference refer to like-named parts in the drawings.

Referring briefly to the drawings, Figure 1 is a side elevational view of the vehicle showing the shovel in partly lifted position.

Figure 2 is a front elevational view of the vehicle with the shovel in loading position.

Figure 3 is a view similar to Figure 1 showing the body in partly tilted position.

Figure 4 is an elevational view of one end of the tilting lever.

Figure 5 is an elevational view of one end of the crank arm, showing the tilting lever release coupling.

Figure 6 is a side elevational view of Figure 5.

Referring in detail to the drawings, the numeral 10 indicates the rear traction wheels of a vehicle. The latter is provided with steerable front traction wheels 11. These wheels support a chassis 12 upon the forward end of which the operator's cabin 13 is located. Behind the cabin an operating shaft 14 is rotatably mounted transversely on the chassis which, intermediate its length has mounted thereon a spur gear 15. The teeth of the gear engage a worm 16 which is mounted on a vertical shaft. The latter at its lower end is provided with a face gear 17 which is meshed with a second worm 18 attached to the shaft of a motor 19.

The shaft 14 has a crank arm 20 extending radially therefrom and is used for actuating the shovel mechanism.

Upon the sides of the cabin a pair of booms 21 are pivotally mounted. The free ends of the booms normally project forwardly and have the sides of a shovel 22 riveted thereto. A pair of levers 23 are pivotally secured to the sides of the cabin 13. The opposite ends of the lifter levers 23 are pivotally secured to lifter links 25. Attached to the lifting levers 23 intermediate their length are operating links 24 which are pivotally secured to the crank arm 20. The link 25 secures the free end of lever 23 to the shovel boom 21 of the mechanism. Mounted upon the chassis 12 of the vehicle is a body which is supported at its rear end upon cam strips 28 and is adapted to be tilted upon these cam strips. The body 26 when tilted is adapted to be retained in position upon chassis body hook members 27 which descend from the floor of the body 26 and register in convenient slots provided in the chassis frame 12. At the forward end of the body a constricted housing 29 is formed integral with said body and receives the load from the shovel. This housing ordinarily assumes a position immediately behind the cabin 13 when the body is at a position of rest. The housing 29 is poised upon the upstanding ear 32 of a bracket, said bracket being adapted to support the forward end of the body from dropping downwardly. The body 26 is surmounted by a hollow cabin which is adapted to keep the contents of the loaded vehicle in sanitary condition and prevent refuse or other material from being scattered over the pavement while the vehicle is in transit. At the rear end of the body 26 the conventional type of tail board 31 is hingedly applied to the structure and is used when the body is to be emptied of its surplus load. A lattice grill work 34 is mounted upon the front of the cabin 13 and serves as a guard to prevent missiles or falling material projected from the shovel to injure the glass shield 35 through which the operator sees the roadway or the work.

The body 26 of the vehicle is tilted upwardly and its rear end is loaded by a lifting lever 36. This lifting lever is provided with a slot 41 at each of its ends. The upper end of the lifting lever 36 is securely attached to a stud 36a while the upper end engages the shank 37 of a coupling attached to the crank arm 20. The coupling is secured to the free end of the crank arm by a nut 39 and has a flange 38 formed integral with the shank, intermediate its length. This flange rests upon the face of the crank 20 and is surmounted by a T shaped member 40, which latter is adapted to register in the slot 41 at the lower end of the lifting lever. When elongated, the portion of the T extension is in a position where it aligns with the slot 41 of said lifting lever 36.

The device is adapted to receive a quantity of refuse or soil upon the floor 33 of the shovel member. This shovel member receives such material when said shovel is in the position as indicated in Figure 3. The entire vehicle is projected into a pile of material with the shovel assuming the position as shown in Figure 3, the mechanism is there actuated. The crank arm 20 is rotated by means of the spur gear 15, which latter is upon the same shaft that the crank arms 20 are mounted on. This spur gear is actuated by a worm 16 mounted upon a shaft with a ring gear 17, which latter is in turn moved by a worm 18, fixed upon the shaft of a motor 19, the boom 21, to which shovel 22 is secured are pivotally anchored at the sides of the cabin 13. These booms are adapted to be swung arcuately in unison by a pair of relatively long lifter levers 23 which latter have their lower ends connected to the cabin of the vehicle and the upper ends are connected to links 25 which are directly pivotally secured to the booms 21, intermediate their length. These lifter levers 23 (one on each side) have secured thereto, intermediate their length, operating links 24, whose upper ends are pivotally secured to the crank arms 20. These links and levers are adapted to swing the shovel arcuately from the position superimposed over the housing 27 of the body when the latter is in a position of rest. The body may be tilted upwardly at its forward end by adapting the body lifting lever 36 to the mechanism. This body lifting lever may be transported in the cabin of the vehicle, or it may be permanently attached to its pivotal point on the stud 36a. When desiring to tilt the body and the housing upwardly, as it is shown partly tilted in Figure 3, the lower end of the body lifting lever 36 is caused to engage the crank arm 20 by slipping T element 40 into the elongated slot 41 at the lower end of the lifting lever. The purpose for which the vehicle will serve as an efficient servant is briefly summarized as follows:

1. The collection of ashes and waste will be sanitary.
2. The loading will be done more rapidly.
3. The lifting capacity of one-shovel-full is equal to one-fifteenth of the entire lifting capacity of the truck.
4. Any driver can be trusted with the loading because of the simplicity of operation.
5. No extra expense is incurred in the operation, except of running the motor.
6. The shovel, and the lever manipulating the shovel will occupy very little space and will not interfere in any way with the working of the truck.
7. The offered self-loading truck will dig ditches, trenches and replace in general the steam shovel. Due to the ease of movement, adaptability and other advantages, this self-loading truck is superior and preferable in many cases to the bulky steam shovel.
8. It will be of great use and advantage to the army for digging trenches, transporting troops and many other activities.
9. The simplicity of construction of my machine will make it possible to convert the present truck into the new model and will be done in an ordinary machine shop.
10. The truck can be loaded anywhere it can pass. In mines and underground work it will be of invaluable service. Naturally, there will be various types of trucks, adaptable to requirements. Occasionally, the lifting capacity's changed, and we again may have to replace a gasoline motor by an electric one, as in underground work.

In cases of excavation we will have to change and strengthen the shovel and levers which operate it but in all cases the principle of loading and unloading will remain the same, not even changing in excavation work.

In conclusion it can be said that the new truck will be more productive and will be operated at a lower cost than the present form of truck.

It is to be noted that certain changes in form and construction may be made without departing from the spirit and scope of the invention.

I claim:

1. In a device of the class described having a tiltable body pivotally mounted on the rear end of the chassis of the device, a crank rotatably mounted on the chassis, means for rotating said crank, a link pivotally connected on the end of said crank, the end of said crank being rotatable from a position below a horizontal line through the axis of rotation of said crank to a position above said line, a lever removably and pivotally secured at its upper end to the forward portion of said body, the lower end of said lever having a longitudinal slot therein, a pin having a head at one end and a screw thread at the other end passing through the adjacent ends of said crank and link, said head having a diametrical key on its outer side, said lever being connected to said crank by registering said key in said slot, said lever when so connected being raised upon upward rotation of the said end of said crank to lift said forward end of said body.

2. In a device of the class described having a tiltable body pivotally mounted on the rear end of the chassis of the device, said device having a driver's cabin at the front thereof, the forward end of said body being spaced-apart horizontally from said cabin, booms pivotally mounted on said chassis and having a shovel rigid on the ends thereof, the forward upper corner of said cabin being cylindrically rounded, means for swinging said ends of said booms in a vertical plane from a position below the horizontal to a position above the horizontal to arcuately lift said shovel above said cabin around said rounded corner, and removable links connecting said forward end of the body with said booms for lifting said forward end to tilt the body during said upward swing of said booms.

WASSYL ORLOWSKY.